Figure 1:
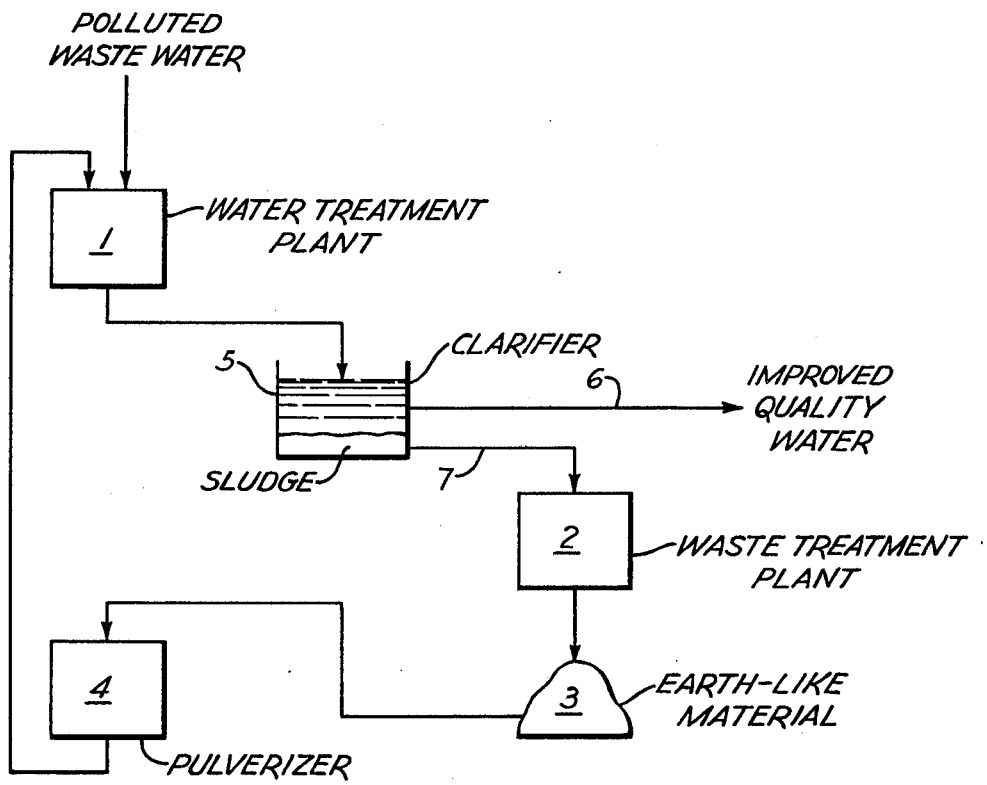

United States Patent [19]

Conner et al.

[11] 4,012,320
[45] Mar. 15, 1977

[54] METHOD FOR IMPROVING THE QUALITY OF CONTAMINATED WASTE WATER

[75] Inventors: Jesse R. Conner, Pittsburgh; Edward A. Zawadzki, McMurray; Ronald J. Polosky, Pittsburgh, all of Pa.

[73] Assignee: Chemfix Inc., Pittsburgh, Pa.

[22] Filed: July 22, 1975

[21] Appl. No.: 598,069

Related U.S. Application Data

[63] Continuation-in-part of Ser. No. 453,844, March 22, 1974, abandoned.

[52] U.S. Cl. .................................. 210/45; 210/47; 210/52; 210/67
[51] Int. Cl.² ........................................ C02B 1/20
[58] Field of Search ................ 210/10, 42, 45, 46, 210/47, 51–53, 66, 67, 75

[56] References Cited

UNITED STATES PATENTS

| | | | |
|---|---|---|---|
| 1,672,584 | 6/1928 | Travers | 210/52 |
| 2,043,458 | 6/1936 | Windecker et al. | 210/42 |
| 2,122,074 | 6/1938 | Stevenson | 210/46 |
| 2,217,466 | 10/1940 | Baylis | 210/52 |
| 2,234,285 | 3/1941 | Schworm | 210/52 |
| 2,542,743 | 2/1951 | Weymouth | 210/503 |
| 3,440,166 | 4/1969 | Davis et al. | 210/45 |
| 3,837,872 | 9/1974 | Conner | 106/74 |
| 3,841,102 | 10/1974 | Cinner et al. | 61/35 |

*Primary Examiner*—Thomas G. Wyse
*Assistant Examiner*—Peter A. Hruskoci
*Attorney, Agent, or Firm*—Brown, Murray, Flick & Peckham

[57] ABSTRACT

An aqueous solution of an alkali metal silicate and a silicate setting agent containing polyvalent metal ions is mixed with waste material to convert the mixture into a consolidated stable earth-like material substantially insoluble in water. The material is pulverized and mixed with polluted waste water, with the mixture being maintained long enough for the pulverized material to react with pollutants in the waste water to reduce or remove them, following which the suspended solids in the water are separated from it, leaving the water improved in quality; that is, water that is materially less contaminated than before treatment.

7 Claims, 3 Drawing Figures

METHOD FOR IMPROVING THE QUALITY OF CONTAMINATED WASTE WATER

This application is a continuation-in-part of our co-pending patent application, Ser. No. 453,844, filed Mar. 22, 1974 now abandoned.

A great amount of water is used in many industrial plants and processing systems, in which the water becomes polluted or contaminated and would be unfit for further use. This not only results in a great waste of the effluent water, but it raises the problem of how to dispose of it without polluting bodies of water, such as streams or lakes, that have a much higher quality; i.e., lower concentration of contaminants. The pollutants are countless; typical ones being liquor from metal pickling lines, waste oil, metal hydroxides, paint, soluble phenols, polymer waste from latex material, cleaning solutions, suspended solids, chemical oxygen demand, BOD, $NH_3$, B, Al, As, Ba, Ca, Cd, Cr, Cu, Fe, Hg, K, Mg, Mn, Mo, Na, Ni, Pb, Se, W, Zn, and such anions as $Cl^-$, $NO_3^-$, $SO_4^=$, $PO_4^=$, $F^-$ and $NO_2^-$, as well as odor and color.

It is among the objects of this invention to provide a method for improving the quality of contaminated waste water by reducing the pollutants therein so that it can be reused or safely discharged, which is simple and inexpensive to practice, and which makes use of other waste material in the process.

The invention is illustrated in the accompanying drawings, in which

Figure 2:
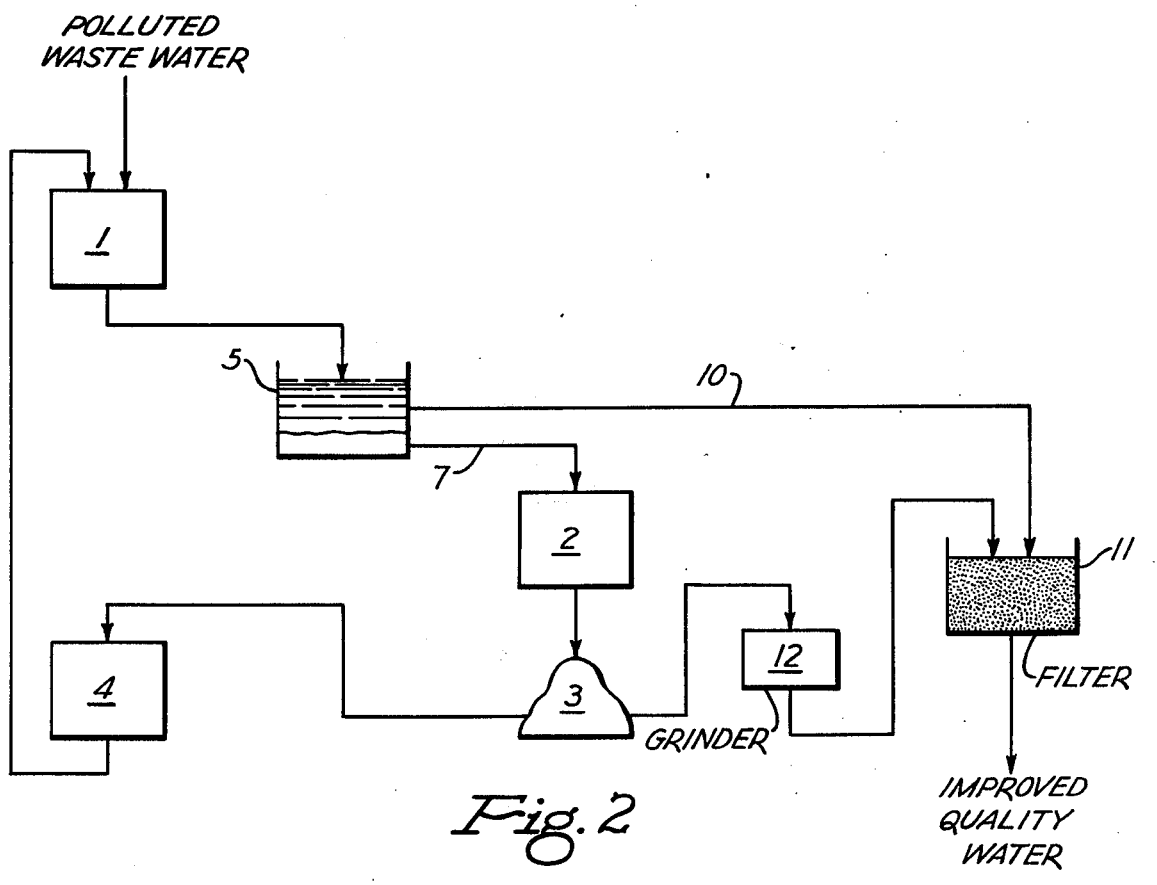
Figure 3:
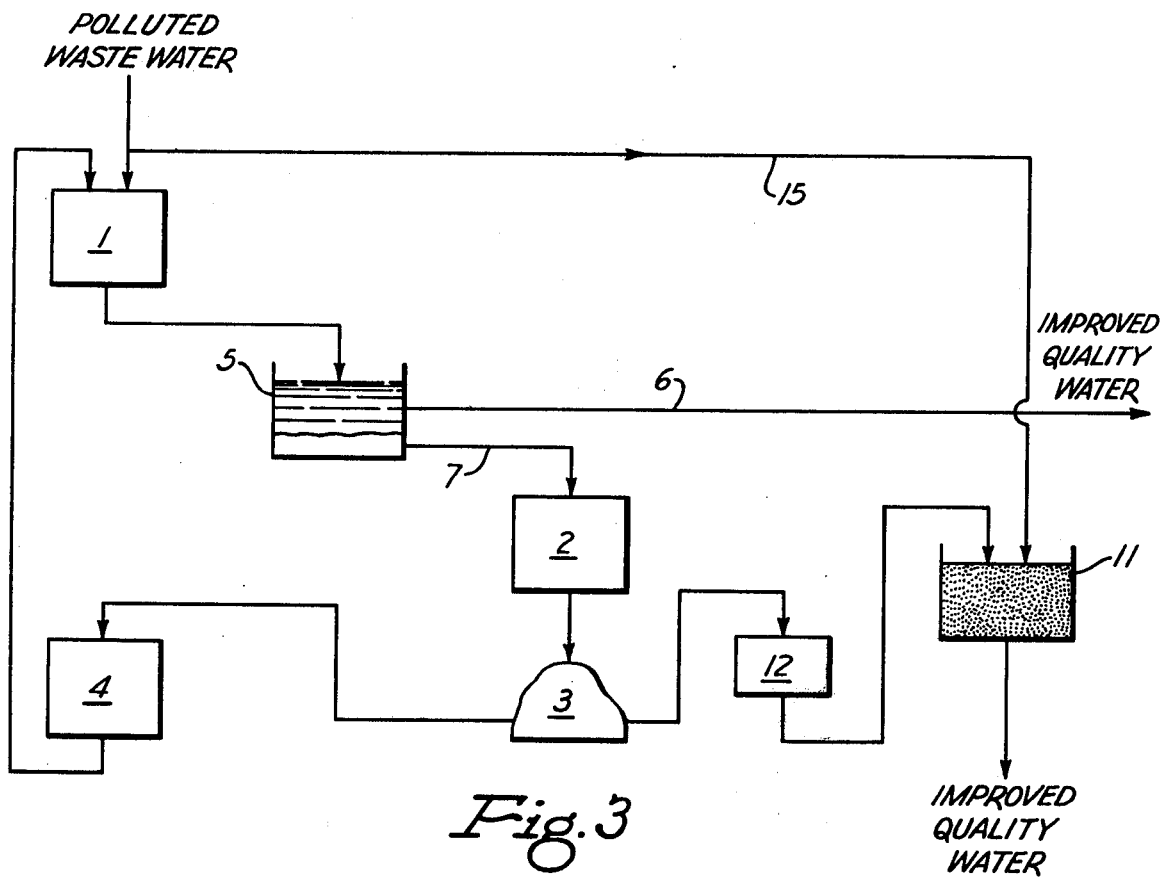

FIGS. 1, 2 and 3 are flow diagrams illustrating our waste water treating method and two variations of it.

Referring to FIG. 1 of the drawings, waste water from an industrial plant or processing system is delivered to a water treatment plant 1, in which the water is treated by mixing with it a special pulverized earth-like material that has a surprising and completely unexpected effect on the waste water. Any type of waste water, as far as we can determine, can be treated in accordance with this invention to improve its quality. The quality is improved by the removal of objectionable pollutants in the water or by their reduction to a point where reuse or safe disposal of the water becomes feasible. The earth-like material before being pulverized for use in the water treatment, is the product of a patented process disclosed in U.S. Pat. No. 3,837,872, which describes the treatment of waste in a liquid or semi-liquid state, such as a sludge or slurry. If a solid waste is to be treated, it is first subdivided by grinding or the like and then a slurry is formed from it. The earth-like material for use in the process described herein may be produced in a waste treatment plant 2 where industrial or domestic waste is treated by mixing with it an aqueous solution of an alkali metal silicate and a silicate setting agent that contains polyvalent metal ions. The silicate and setting agent chemically react with each other and the waste to convert the mixture into a consolidated chemically and physically stable earth-like material 3 that is substantially insoluble in water. If in making this earth-like material more silicate and setting agent are used than is necessary for the chemical reaction, an excess of those two chemicals will remain in the earth-like material. Nevertheless, the volume added to the waste by the treatment chemicals is nearly always less than 10% and often is below 5%. The best amount of silicate and setting agent in the mixture will depend mainly on the composition of the waste. The pollutants in the waste material, whether it originally was solid waste, liquid waste or a semi-liquid waste such as a sludge or slurry, are locked in the earth-like material resulting from the treatment just described, so that the treated material can be used in the water treatment process described herein without those pollutants contaminating the waste water being treated.

Although any alkali metal silicate can be used in the treatment of the waste material in plant 2, including potassium silicate and lithium silicate, sodium silicate is preferred because it is the least expensive and is generally available throughout this country. Ordinarily, it will be used in its liquid commercial form.

A variety of setting agents also are applicable to the practice of the process in plant 2. In general, acids or acidic materials act promptly to cause gelatin or setting of the silicate. If the setting agent is to be added to the mixture, as distinguished from the case where the waste already contains a setting agent, it should be a polyvalent metal compound; that is, a composition containing polyvalent metal ions. It has been found that setting agents which are only slightly soluble, or compositions containing only small amounts of soluble setting agents, are most desirable for commercial use with this process. Such setting agents are typified by such compounds as Portland cement, lime, gypsum, and calcium carbonate, which are the cheapest and most available, although, as pointed out in the patent, aluminum, iron, magnesium, nickel, chromium, manganese, or copper compounds could be used. The properties of Portland cement as a setting agent are excellent and it is economical and readily available in large quantities at low prices throughout the United States. Also, its reaction rate with the silicate is easily controllable. On the other hand, if cement alone were used without the silicate, the chemical reaction would not be the same and in many cases there would be no reaction at all with such pollutants as the toxic polyvalent metals to produce insoluble compounds. Therefore, leaching of a cement composition produces large quantities of dissolved polyvalent metals.

The interactions between the waste and the chemicals in waste treatment plant 2 become extremely complex because many different reactions occur simultaneously, especially with wastes containing a variety of reactive pollutants. However, three classes of interactions can be identified:

A. Reactions between sodium silicate and the waste being treated. Sodium silicate reacts with all polyvalent metal ions, with acids, with certain other cations and anions and with a number of organics. These interactions result in the neutralization of acids and in the almost complete insolublization of almost all polyvalent metal ions. This latter ability of sodium silicate is one of its prime virtues, since the largest group of toxic pollutants from industrial wastes are metal ions. The insoluble compounds produced are non-toxic and cannot be resolublized later.

B. The silicate with certain reactive components of the setting agent. For example, it reacts with the calcium ion of Portland cement, lime, gypsum and calcium chloride. In the case of other setting agents it would react with other metal ions or with acidic components. When this reaction occurs slowly, as it does with these slightly soluble classes of setting agents, the resultant reaction product is a gel structure that has a number of very important properties. These gels act as a sort of sponge, have the unique property of being able to hold within themselves very large quantities of water and non-reactive materials of other sorts while acting in all respects like a solid. Because of their properties they also hold ions in place by various chemical and physical bonding mechanisms and thereby act much like an ion exchange resin. Other waste components, such as organic materials, including those found in sewage sludge, are also entrapped in the structure and thereby immobilized. This gel-forming capacity is an important reaction, especially for those waste components that do not react directly with the sodium silicate, and it also provides the desirable physical properties of the final solidified waste.

C. In the case of setting agents such as Portland cement, the setting agent itself also undergoes a series of reactions with water, starting with hydrolysis and continuing through hydration and other interactions. This provides a continuing hardening effect. It is also believed that during this hardening further reactions occur between the setting agent and the silicate and in some cases between the setting agent and the silicate and in some cases between all three components: the setting agent, the silicate, and the waste.

The treatment of solid waste in the form of household refuse may be illustrated by the following example in which the refuse treated included animal and vegetable food wastes, paper, plastics, glass, metal and other household wastes combined in the proportions in which they were generated in an actual household.

Household refuse as described above was mixed with sufficient 30 percent calcium chloride solution to make a stiff slurry. A quantity of sodium silicate solution equal to the volume of calcium chloride solution was then added quickly and the mixture shaken. Solidification occurred almost instantaneously to a point where the mixture would not flow and resisted penetration by any blunt object to about the same degree as a hard soil or clay. It was observed that some fluid was entrapped in pockets in the material due to the rapid gelling. This mixture was kept in a closed glass bottle for a period of one month. During this time no gas evolution occurred, as evidenced by the lack of pressure built up inside the bottle; while the mixture exhibited an unpleasant odor when the jar was opened there was no evidence of the extensive putrifaction which would normally be expected to occur in such a mixture. The glass jar was broken away from the mixture and it was allowed to dry in the air for 2 months. During drying there was some shrinkage and the material crumbled somewhat to resemble a well dried out soil or clay. It still had considerable cohesive strength and very little compressibility and it was observed that this mixture either wet or dry would constitute a landfill material at least equal to usual soils in its load bearing ability and stability.

The following examples are concerned with the treatment of liquid and semi-liquid wastes to produce an earth-like material that is non-polluting.

A number of mixtures of acid mine sludge and sodium silicate were made. Such sludges contain, generally, hydroxides or hydrated oxides of iron and manganese, calcium sulfate, and other minor mineral constituents. The sludge was an actual concentrated sludge from acid mine water treatment and consisted of about 12 percent solids with a pH of 7. Mixtures were made containing acid mine sludge to sodium silicate ratios of 10 to 1, 4 to 1, and 3 to 1. These mixtures all set to homogeneous gels within 30 seconds. The mechanical characteristic of these gels was very soft, firm and very firm, respectively. Duplicate samples were allowed to dry. They all resulted in very hard residues, but they were friable.

A sulfuric acid synthetic pickle liquor was prepared by subjecting Type 302 stainless steel scrap to 12 percent sulfuric acid at 180° until reaction ceased. A sample of the cooled liquor was mixed with sodium silicate solution in the ratio of 1 to 2. The sample required more than an hour for completion of the reaction to give a hard precipitate. A duplicate sample was allowed to dry in air, resulting in a hard friable residue of precipitated metal compounds and silicates.

About 2,000,000 gallons of sludge from the waste water treatment plant of a major steel mill was treated using this process. The waste had a total solids content ranging from 10 percent to 20 percent with relatively little dissolved solids. The solids consisted of metal hydroxides, river silt, sludge from a secondary sewage treatment plant and tramp oil. It had an unpleasant, oily, metallic smell, high viscosity, and a black appearance much like used motor oil. The sludge was homogenized by circulation in the storage lagoon and then was pumped through a mobile treatment unit at the rate of about 150 gallons per minute. Portland cement was first added with thorough mixing at the rate of 0.33 pounds per gallon of sludge, followed by the addition of 0.1 gallon of sodium silicate per gallon of sludge. This was done in a continuous mixer and the waste was subsequently pumped about 300 feet to the disposal area. Gelation occurred within 15 minutes and the material hardened within 48 hours to a soft, clay-like consistency. The black color (primarily due to ferrous hydroxides and oil) changed as hardening occurred to a reddish-brown, clay-like appearance as ferrous iron was oxidized on exposure to the air. Encapsulation of the oil was so complete that no oily appearance or feel could be detected. A very slight odor remained which was detectable only by crumbling the material and smelling it closely. The final product was considered non-polluting in all respects and was handled by earth moving equipment to fill in gullies in the existing plant property. It was a satisfactory landfill.

Waste from the plant and sludge from the waste treatment plant of a large automotive assembly operation was treated with the same procedure as in Example 4, except that chemical additions were at the rate of 0.83 pounds of Portland cement per gallon of waste and 0.02 gallons of sodium silicate per gallon of waste. The waste here considered of precipitated metal hydroxides of various types, paint sludge, sludge from phosphating and cleaning operations, tramp oil, and small quantities of various other miscellaneous plant wastes. Solids content was about 5 percent to 10 percent. This material was treated at the rate of up to 200 gallons per minute and produced a hard, friable light gray material with much the appearance of natural rock. It had no odor. This material was deliberately made harder than normal and some difficulty was experienced in breaking it up with earth moving equipment. It was judged that it would have made excellent landfill if cast into place without further handling. About 300,000 gallons of the material was treated. Several months later the job was repeated on the refilled lagoons with about 500,000 gallons of material. This time the additions of both cement and silicate were lower by about 10 percent, resulting in a softer, more easily handled, dirt-like material.

About 10,000 gallons of hot (150° F), acid, condenser cleaning solution were treated at a major power plant. The solution consisted of hydrochloric acid as well as foaming agents and inhibitors, and was partially neutralized with the sodium hydroxide used as the final condenser wash. Portland cement used was at the rate of 1.7 pounds per gallon of waste, and sodium silicate at the rate of 0.08 gallons per gallon of waste. Larger quantities of chemicals were required here because of the high free acid and free metal ion concentrations in the waste material. The product solidified satisfactorily and was left in place as a thinlayer landfill at the site. A similar job was done at another power plant where the boiler washing consisted of spent hydroxyacetic and formic acid solutions containing oil and dissolved and suspended heavy metals. This was done at ambient temperatures near the freezing point, using approximately the same ratios of chemicals as with the previous power plant job, except that in this case the waste, while still liquid, was pumped under water. Three days later when the water was drained, the waste was found to have solidified into a very hard, clay-like material. The test was considered satisfactory.

The amounts of silicate and setting agent to be used in producing the non-polluting earth-like material depend in large part upon the water content of the raw waste, the grade of silicate, and upon the hardness desired in the final fixation product. Consequently, amounts applicable to all purposes cannot be stated but they are readily determinable in any given case. As far as it known, there is no liquid or semi-liquid waste that cannot be treated by the process disclosed in U.S. Pat. No. 3,837,872.

For many purposes it is preferred that the setting agent be in the form of a dry solid (reactive with the silicate) added to the waste to be fixed, either before or after the addition of the silicate because this often provides a better fixed product than when setting is caused by a liquid.

After the earth-like material has been produced from waste in the patented manner described above, some or all of it is pulverized in a pulverizer 4 to form a material that more or less resembles sand; i.e., it looks and feels like sand. This pulverized material is what is used in treating the waste water in the water treatment plant 1, where the pulverized material is mixed with the water. From plant 1 the mixture flows to means for separating out the suspended solids in the water, including the pulverized material and the solids formed by its chemical reaction with pollutants in the water. Separation of the solids can be done in various ways, such as by a filter, centrifuge or a conventional clarifier 5. The latter is a simple way of accomplishing the desired result as illustrated in the drawing.

The addition of the pulverized material to the waste water raises the pH of the water and results in rapid settling of the solids. The pulverized material has a fairly high reserve alkalinity and therefore is capable of neutralizing acid in the waste water. In doing this, metal ions are precipitated. Excess silicate, often present to some extent in the pulverized material, reacts directly with metal ions to produce various insoluble metal compounds, such as calcium silicate, nickel silicate and copper silicate. Furthermore, the pulverized material produced from inorganic wastes has large ion exchange capacity and acts in this capacity to remove metals; for example, chromium, copper, nickel, zinc, etc., from the solution. The pulverized waste material has a high surface area per unit weight and surprisingly acts very strongly as a sorption agent to remove metal ions, some anions, many organic materials, taste, odor, COD, etc. It will absorb soluble phenols and polymer waste from latex material. The particle size of the pulverized material allows it to settle rapidly and carry along with it suspended solids in the waste water. In this respect it acts as a flocculating and settling agent. The amount of pulverized material used depends to a large extent upon the degree of pollution of the waste water, but that can readily be determined in advance by laboratory analysis of a water sample.

Although the reactions just mentioned start to occur as soon as the pulverized material is added to the waste water, they are completed in the clarifier as the solids settle. The solids that settle out of the water form a sludge in the bottom of the clarifier. The residence time of the mixture in the clairifier is long enough for the settling to be completed by the time the water reaches the outlet of the clarifier. The time may vary between about 10 seconds and 15 minutes, depending on such factors as flow rate, size of clarifier, settling rate and the composition of the waste water itself. Determination of the necessary residence time for any given set of factors presents no problem.

The water, the quality of which has now been improved by reducing its contamination in the manner explained in the two immediately preceding paragraphs, is discharged from the outlet in the upper part of the clarifier through pipe 6. It can be safely discharged into a stream or other body of water. For example, when waste water containing such pollutants as iron, nickel, zinc, copper chromium, cyanide, $NH_3N$ and chemical oxygen demand material is treated as disclosed herein, the percentage of these pollutants remaining in the water will be reduced to an extremely low figure, in most cases to a fraction of one percent. If the waste water is from a steel mill operation and contains, for example, around 200 parts per million of iron and 250 parts per million of sulphuric acid, the iron will be precipitated as iron silicate and iron hydroxide so that only a few parts per million of the iron remains in the treated water. Also, the sulphuric acid will be neutralized because the pH of the water will be raised from 5 or less to 7 or 8.

The sludge in the bottom of the clarifier may be delivered through a pipe 7 to the waste material treatment plant 2, where it can be treated with a silicate and silicate setting agent by the process explained above and then pulverized for treatment of still more waste in accordance with this invention. This not only takes care of the sludge, but it also provides much of the material for treating the waste water. If there is not enough sludge for this purpose, it can be supplemented by other waste delivered to plant 2 for treatment and later pulverizing.

It is important to note that in the waste water treatment described herein the waste water is not treated by simply adding an alkali metal silicate and a silicate setting agent to the water, but by mixing with the water a pulverized solid material that is the result of a rather complicated chemical reaction. Also, the waste water treatment is primarily a chemical reaction, not a physical or coagulation process. In U.S. Pat. No. 2,122,074, on the other hand, the sewage treatment process is primarily a physical process in which coagulation is depended upon to remove the solids, which is all that is done. The use of sodium silicate in that process would not result in a process similar to the one disclosed herein, in which waste water is not treated with sodium silicate but with an earth-like material made by a recently patented method and which improves the quality of waste water much more than sodium silicate would do. The use of sodium silicate in the prior art has been for the purpose of quickly removing fine suspended solids; i.e., very small particles that tend to remain suspended in waste water but which are not dissolved in the water. The sodium silicate is not effective in removing soluble contaminants, such as dissolved metal ions and organics. The method disclosed herein, on the other hand, does both. There are unexpected absorption of some pollutants, and more chemical reactions and better settling of the solids than would occur if sodium silicate were used as the treating agent. Dissolved contaminants are removed to a very large degree.

In a test that was conducted with the pulverized solid or earth-like materials resulting from treating automobile plant wastes with sodium silicate and a settling agent as explained herein, the pulverized materials was mixed with synthetic metal finishing waste water in the proportions of one part pulverized material to eight parts of waste water by weight. After settling of the solid, the supernatant (treated waste water) was analyzed. The following table gives the data from this test:

ANALYSIS OF SYNTHETIC METAL FINISHING WASTE WATER IN PARTS PER MILLIION (ppm) OF METAL ION

| CONSTITUENT | BEFORE TREATMENT | AFTER TREATMENT | % REDUCTION |
|---|---|---|---|
| $Cu(NO_3)_3 \cdot 9 H_2O$ | 9,600 | 0.30 | 99.997 |
| $Cu SO_4$ | 650 | <0.10 | 99.98 |
| $Fe SO_4 \cdot 7 H_2O$ | 1,100 | <0.10 | 99.99 |
| $Fe Cl_3 \cdot 6 H_2O$ | 450 | <0.10 | 99.97 |
| $Pb(NO_3)_2$ | 76 | <0.10 | 99.87 |
| $Hg(NO_3)_2 \cdot H_2O$ | 870 | <0.10 | 99.99 |
| $Ni Cl_2 \cdot 6 H_2O$ | 85 | <0.10 | 99.88 |
| $Zn O$ | 730 | <0.10 | 99.99 |

In another test, in which the subdivided earth-like material came from treated steel plant waste, one part of that material was used for treating 32 parts of contaminated waste water by weight. The results are shown in the following table:

ANALYSIS OF CONTAMINATED WATER IN PARTS PER MILLION (ppm)

| CONSTITUENT | BEFORE TREATMENT | AFTER TREATMENT | % REDUCTION |
|---|---|---|---|
| Iron | 720 | <0.10 | 99.99 |
| Manganese | 3.2 | 0.50 | 84.0 |
| Nickel | 87 | <0.10 | 99.9 |
| Zinc | 42 | <0.10 | 99.8 |
| Copper | 1,200 | <0.10 | 99.99 |
| Chromium | 3.8 | 0.25 | 93.0 |
| Cyanide | 2.1 | <0.10 | 99.5 |
| Nitrogen, as $NH_3$ | 375 | 110. | 71.0 |
| Nitrogen, as $NO_3^-$ | 2.4 | .25 | 90.0 |
| Chemical Oxygen Demand | 38,000 | 1,000. | 97.0 |

These tables indicate that practically all contaminants are removed or reduced, at least to some degree, by the waste water treatment process described herein. The quantities of solid material used in the treatment can range from a fraction of a percent to equal parts by weight, or even greater, of waste water, depending upon the concentration of contaminants in the waste water. Of course, that is determined in advance by checking the waste water in a laboratory.

In the modification shown in FIG. 2 the water treatment process just explained is used, but instead of discharging the treatment water from the clarifier 5 into a stream or the like, the quality of this water is still further improved by delivering it through a pipe 10 to a filter bed 11 that is formed from waste that has been treated as explained herein to produce the earth-like material. This material can come from the waste treatment plant 2. Instead of being pulverized, however, the material is ground in a grinder 12 to subdivide it into larger particles than the pulverized material. The water leaving the filter bed through the pipe at its bottom has thus been treated twice, once in the water treatment plant 1 and once in the filter bed 11. The water discharged from the bed can be delivered to a stream or the like or it may be pure enough to be used again in the industrial plant from which it came originally, thereby conserving water by recycling it.

The variation shown in FIG. 3 is the same as the one just described, except that the improved quality water from the clarifier 5 is discharged to a stream or the like through pipe 6 as in FIG. 1, while some of the untreated polluted waste water is delivered to the filter bed 11 by a pipe 15 that receives waste water before it can reach the water treatment plant 1. Consequently, some of the waste water is treated with the pulverized earthlike material in treatment plant 1, and the rest of the waste water is treated by percolating down through the filter bed 11 formed from ground earth-like material from grinder 12.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A method for improving the quality of contaminated waste water by reducing the pollutants therein so that it can be reused or safely discharged, comprising pulverizing solid material obtained by mixing with liquid or semi-liquid waste material an aqueous solution of an alkali metal silicate and a silicate setting agent from the group consisting of Portland cement, lime, gypsum and calcium chloride, the amounts of said silicate and setting agent used being such as caused them to chemically react with each other and convert the mixture into a consolidated chemically and physically stable earth-like material substantially insoluble in water and with its pollutants entrapped in the solidified silicate, mixing an effective amount of the pulverized material with said waste water and maintaining them together long enough for the pulverized material to react with pollutants in the waste water to reduce the amount of said waste water pollutants and thereby improve the quality of the water, and then separating from the water said pulverized material and pollutants.

2. A method as recited in claim 1, in which said earth-like material is pulverized to resemble sand in appearance.

3. A method as recited in claim 1, including using the separated solids as waste material to be converted into earth-like material in the manner recited in claim 1 for subsequent pulverization and use in improving the quality of waste water.

4. A method as recited in claim 1, including using the separated solids as waste material for conversion into earth-like material in the manner recited in claim 1, grinding at least some of said last-mentioned earth-like material to form granular material, forming a bed of said granular material, and delivering water from which said solids have been separated to said bed for further treatment thereby as the water passes through the bed.

5. A method as recited in claim 1, including using the separated solids as waste material to be converted into earth-like material in the manner recited in claim 1 for subsequent pulverization and use in improving the quality of waste water, grinding some of said last-mentioned earth-like material to form granular material, and delivering water from which said solids have been separated to a bed formed from said granular materials for further treatment thereby as the water passes through the bed.

6. A method as recited in claim 1, including using the separated solids as waste material to be converted into earth-like material in the manner recited in claim 1 for subsequent pulverization and use in improving the quality of waste water, grinding some of said last-mentioned earth-like material to form granular material, and delivering polluted waste water directly to a bed formed from said granular material for treatment thereby as the water passes through the bed.

7. A method as recited in claim 1, including grinding some of said earth-like material to form granular material, forming a bed of said granular material, and delivering said water from which said solids have been separated to said bed for further treatment by the bed as the water passes through it.

* * * * *